Figure 1:
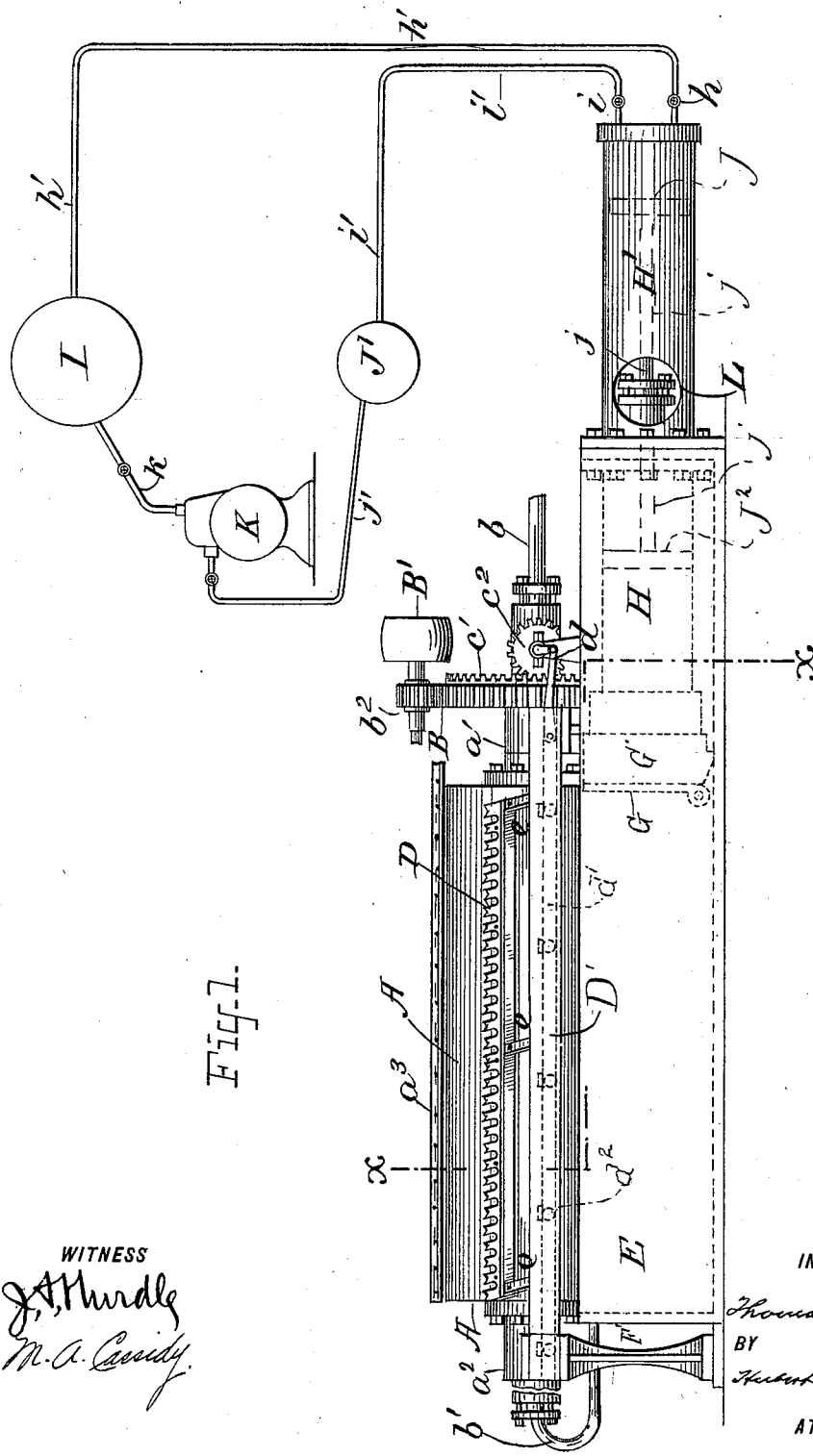

No. 607,764. Patented July 19, 1898.
T. L. RANKIN.
ICE MAKING APPARATUS.
(Application filed May 19, 1897.)

(No Model.) 3 Sheets—Sheet 1.

WITNESS

INVENTOR

ATTORNEY

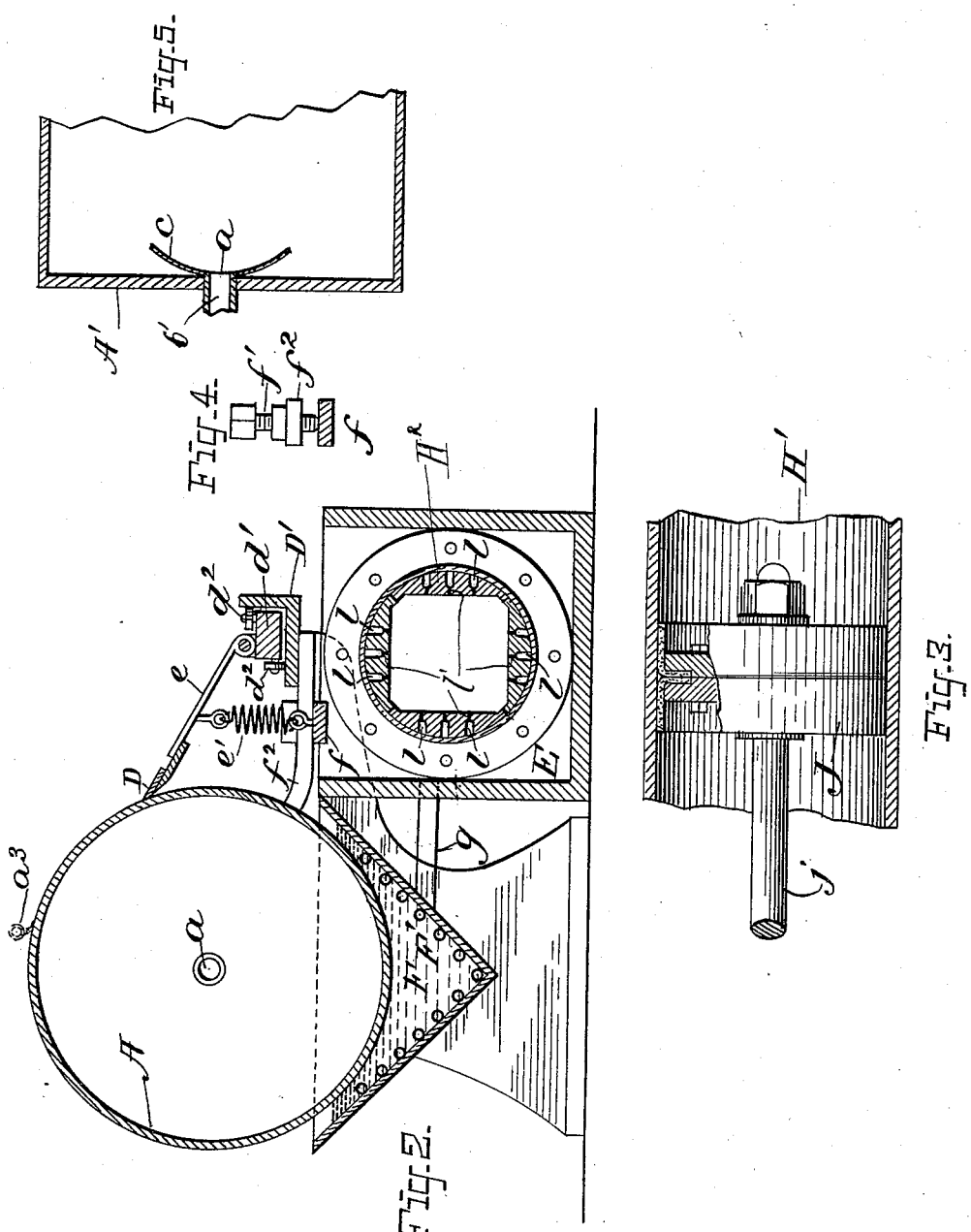

No. 607,764. Patented July 19, 1898.
T. L. RANKIN.
ICE MAKING APPARATUS.
(Application filed May 19, 1897.)
(No Model.) 3 Sheets—Sheet 3.
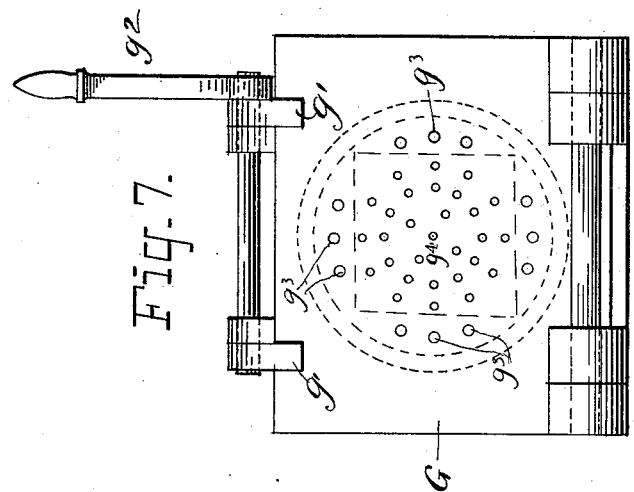
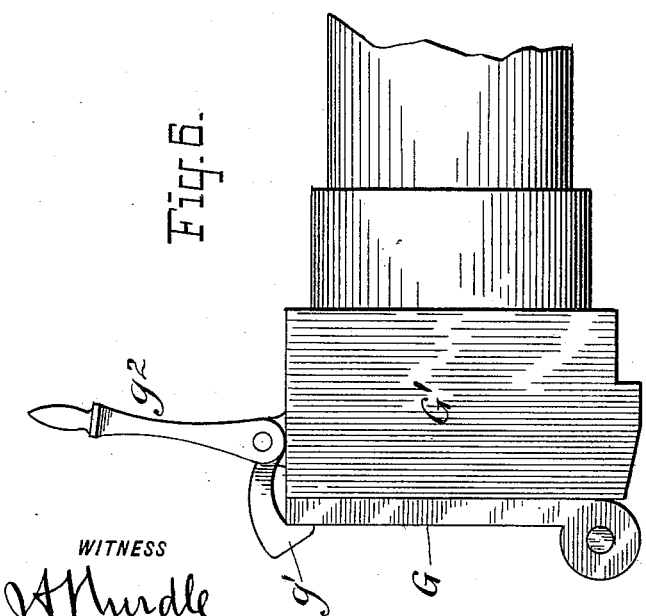
WITNESS
INVENTOR
BY
ATTORNEY

UNITED STATES PATENT OFFICE.

THOMAS L. RANKIN, OF SACKETT'S HARBOR, NEW YORK, ASSIGNOR TO THE REGELATION ICE MACHINE COMPANY, OF ALEXANDRIA, VIRGINIA.

ICE-MAKING APPARATUS.

SPECIFICATION forming part of Letters Patent No. 607,764, dated July 19, 1898.

Application filed May 19, 1897. Serial No. 637,197. (No model.)

*To all whom it may concern:*

Be it known that I, THOMAS L. RANKIN, a citizen of the United States, and a resident of Sackett's Harbor, in the county of Jefferson and State of New York, have invented certain new and useful Improvements in Ice-Making Apparatus, of which the following is such a full, clear, concise, and exact description as will enable others skilled in the art to which my invention appertains to make and use the same, reference being had to the accompanying drawings, forming part of this specification.

The object of my invention is to produce a speedy and economical apparatus for making clear ice; and to this end the invention consists in the construction and arrangement of the devices and parts hereinafter described and as stated in the claims hereof.

In the drawings, Figure 1 is a side elevation of the apparatus, showing a revolving freezer on which the ice is formed, a saw and attachments for operating the same and removing the ice when formed, a tank for receiving the ice so removed, a press and hydraulic ram for operating the same, and various connecting parts. Fig. 2 is a transverse section of the same, taken on the line $xx$ of Fig. 1, showing the trough for supplying the water to be frozen on the cylinder, the saw for removing the ice therefrom and the attachments for operating the same, and a tank for receiving the ice removed by the saw, as well as the segments by which the interior of the mold is made square. Fig. 3 is a sectional view of a portion of the ram, showing a bucket-plunger for the same. Fig. 4 is a detail of a screw and nuts for regulating the tension of a spring which holds the saw against the ice as it is formed on the freezer. Fig. 5 is a detail sectional view of one end of the freezer in which the liquefied gas or refrigerating agent expands, showing a circular concave deflecting-plate surrounding the outlet for the expanded gas. Fig. 6 is a side view of the ice mold or press, showing a cast head forming the main shell or chamber, a door and means for opening and closing the same, and also a wrought-iron cylinder or pipe for receiving a plunger connected with the ram for operating the same; and Fig. 7 is an end view of the same, showing perforations in the door for permitting the escape of water during the process of molding the ice.

In the drawings, A represents the revolving freezer, which forms an expansion-chamber for liquefied ammonia or gas coming from any kind of gas-liquefying apparatus. This freezer or cylinder A may be made of a large piece of wrought-iron or steel pipe, having heads $A'$ preferably welded to the end of the steel or wrought-iron pipe, which heads are each provided with a central hole $a$, against which are bolted flanged hollow shafts $a'$ and $a^2$, arranged with stuffing-boxes for the admission of corresponding pipes $b$ and $b'$. The liquefied gas coming from a suitable receiver passes through the pipe $b$ to the cylinder A, and after expanding therein passes out at the opposite end through the pipe $b'$, and returns by suitable connections to the means employed for reliquefaction. At the end of the freezer from which the expanded gas passes out I provide a circular concave deflecting-plate $c$, (shown in Fig. 5,) which has an opening corresponding with the gas-outlet $a$ in the head of the cylinder, and secure the deflector on the inside of the head either by welding or bolting before the head is secured to the cylinder. This deflector prevents the escape of the gas from the cylinder in a liquefied form, a tendency which would be imparted to it by the revolution of the cylinder carrying the liquid around with it at the outlet end. By the use of this deflector its escape too rapidly or before expansion will be prevented.

The hollow shafts $a'$ and $a^2$ are arranged to turn in bearings or boxes, and on the shaft $a'$ is a gear-wheel B, gearing with a pinion $b^2$, connecting with and arranged to be rotated by a pulley $B'$. The gear-wheel B is provided with side cogs or teeth $c'$, which operate the cogs of a pinion $c^2$, attached to a short shaft having a crank $d$, provided with a connecting-rod for operating a saw D, secured to a bar $d'$, having rollers $d^2$, which travel on and against the flanges of an angle-iron $D'$. The saw D is supported by three braces $e\ e\ e$, hinged to the bar $d'$, and each of the braces $e$ is provided with an eye, to which a spring $e'$ is hooked at its upper end, and these springs are attached at their lower ends to a bar $f$, supported by regulating-screws $f'$, which pass through a bar or plate $f^2$, as shown in Figs. 2 and 4. The tension of the springs controls the pressure of the saw D upon or against the ice formed on the cylinder A, and the hinged bars $e\ e\ e$ are long enough to leave open spaces between the saw and the traveling bar $d'$, which operates it, through which spaces the ice may fall from the cylinder A to a tank E. (Best shown in Fig. 2.)

The water to be frozen on the outer surface of the cylinder A is contained in a trough F, which is provided with a coil of pipe F', lying inside of the same against its sides and to which the outlet-pipe $b'$ is connected to bring the returning gas from the cylinder A through the trough, which, by further expansion in the coil F' assists in cooling the water to be frozen. The trough F connects by a pipe $g$ with the tank E, which contains water of the same level mixed with the ice falling from the cylinder A when chipped therefrom by the saw D. In case the cylinder does not bring up enough water from the tank F to wash the ice from the saw a pipe $a^3$ is placed so as to permit water to flow on the cylinder above the same, and thereby wash the chipped ice from the cylinder, and also make up any deficiency there may be in keeping the cylinder supplied with water to be frozen.

When sufficient ice has accumulated in the trough E, the door G of the ice-press H being open, the ice is pushed into the press by any suitable means, which may, if desired, be a perforated hand scraper. (Not shown.) The press being filled with ice and water or slush-ice, the door of the press is closed and the ram H' set in operation by opening the cock $h$, which connects by a pipe $h'$ with a high-pressure cylinder I. This high-pressure cylinder may be made of a twenty-four-inch pipe eight feet long and carry a water-and-air pressure of from fifteen to twenty atmospheres. This pressure acts upon the plunger J in the ram H' and connects by a rod $j$, which passes through a stuffing-box and is provided with a plunger J in the press H, the ram and press being made of like wrought-iron pipe provided with or screwed into like flanges, which are bolted together. When the piston in the press ceases to move farther by the action of the ram, the cock $h$ is partially closed and the door G of the press opened. This door may either slide or be hinged, as shown, in which case it is held closed by hooks $g'$, operated by a hand-lever $g^2$. When the ice has been thus molded and the door of the press opened, the plunger J will push the cake of ice out of the press into the tank E, from which it can be removed by slides or direct hoist. When the ice is forced out of the press, the cock $h$ is closed and the cock $i$ in the pipe $i'$ is opened. The pipe $i'$ connects with a vacuum-tank J', from which water is pumped by a pump K, connected therewith by a pipe $j'$ and with the high-pressure cylinders I by a pipe $k$. A large air-opening L is made in the pipe that forms the ram beyond the checks that prevent any further movement of the ram after forcing the piston flush with the press. When the water is pumped from the vacuum-tank J', the air which comes in through the opening L will give an atmospheric pressure upon the outer bucket-plunger of the piston of the ram and force the piston back to its former position by reason of the vacuum produced on the opposite side. The opening L also serves the purpose of permitting access to the stuffing-box bolted to the two-inch end of the tank E, through the flange of which bolts pass and connect the ram with the press.

In order to maintain the pressure on the tank I, air is first pumped into it by the pump K until a pressure of two hundred to two hundred and fifty pounds per square inch is reached, and water is then admitted to the tank J' and pumped into the tank I with the air until a pressure of from three hundred to four hundred pounds is produced. The air in the tank I will form an expansion-cushion on the water, so that the pressure will not become too low when the ram is being operated.

The press H may be made very strong and cheap by the use of ordinary steel or wrought-iron pipe threaded at both ends, one end of which is screwed into the flange for connecting with the ram, and the other end to a large cast head G' for the formation of a mold, with its door attachments. The inside of the head conforms to the size of the inside of the cylinder which connects with the ram, and its interior is made square by the use of cast segments H², the rough outer surfaces of which conform with sufficient exactness to the cylindrical opening cast in the head. The outer surfaces of these segments are fluted or provided with grooves $l\ l$, which connect with rows of holes $l'$, leading to the interior of a planed flat surface, by which the square sides of the mold are formed. The grooves in the segments also connect with perforations $g^3$ in the door G, which may also have smaller perforations or openings $g^4$ in the center, connecting with the square portion of the mold, so that when the ice is being molded the water pressed therefrom will escape outward through the perforations in the segments and in the door, and the water at the door will be forced out through the central openings therein.

Having thus described my invention, what I claim as new, and desire to secure by Letters Patent, is—

1. An ice-machine comprising a water-tank, a rotating freezing-cylinder mounted longitudinally therein, means for supplying the cylinder with a refrigerant, a second tank alongside the first tank, a saw or scraper over the partition between the two tanks to remove the ice from the cylinder and discharge it into the second tank, a longitudinally-extending press having its compression-chamber opening into one end of the second tank and there provided with a door to admit the slush from said tank into the compression-chamber and permit the discharge of the formed block of ice into the tank by the plunger of the press.

2. The combination with the water-tank and rotary freezing-cylinder, of a reciprocating bar parallel with the cylinder and provided with braces or arms projecting toward the cylinder, a saw-blade secured to the ends of the braces or arms adjacent to said cylinder and parallel with said reciprocating bar, to permit the ice as removed to fall down through the spaces therebetween, and mechanism for operating the cylinder and the bar.

3. The combination with the cylinder and its tank, of a second tank alongside thereof, a guideway extending longitudinally across said second tank, a reciprocating bar mounted on said guideway parallel with said cylinder, spring-pressed arms hinged to said bar and projecting toward the cylinder, a saw-blade secured to said arms adjacent to the cylinder and over the partition between the two tanks to remove the ice from the cylinder and direct it down into the second tank through the space between it and its operating-bar and means for operating the cylinder and the bar.

4. The combination with the cylinder and its tank, of a second tank alongside thereof, an angle-bar mounted longitudinally over the second tank, a reciprocating bar having vertical and horizontal rollers engaging the two sides of the said angle-bar, vertically-swinging spring-pressed arms projecting from the bar toward the cylinder and there provided with a saw-blade parallel with the bar with its tooth edge next to the cylinder, a combined spur and crown gear on the cylinder-shaft, a short transverse crank-shaft having a pinion meshing with said crown-gear, a rod connecting the crank with the reciprocating bar, and a drive-shaft geared to said spur-gear.

5. A combined freezing and compressing apparatus, comprising parallel longitudinal tanks, the freezing-cylinder in one tank, means for removing the ice from the exterior of said cylinder and discharging it into the second tank, a longitudinally-extending ice-press having its compression-chamber within one end of said second tank and there provided with a door through which the slush may be passed into said chamber and the formed block removed, the said chamber being provided with longitudinal water-outlet channels extending inwardly from its open end and communicating with the interior of said chamber and the door having a series of perforations registering with the outer open ends of said channels.

6. The combination with a longitudinally-extending tank and means for supplying the same with ice or slush, of a longitudinally-extending press having its compression-chamber entering the tank at one end and there provided with a door having outer and inner series of perforations, the said chamber having longitudinally-extending channels communicating with the interior of said chamber and at their outer open ends registering with the outer series of door-perforations.

7. The combination with a longitudinally-extending tank and means for supplying the same with ice or slush, of a longitudinally-extending press having its compression-chamber entering one end of the tank and there provided with a hinged door, and a latch mounted on the chamber to engage the free edge of the door and provided with an operating handle or lever projecting upwardly above the tank.

8. The combination with ice-forming mechanism, of a press provided with a compression-chamber open at its end to receive the ice or slush, and there provided with a door having inner and outer series of perforations, the said chamber having longitudinal channels registering with the outer series of door-perforations and communicating with the interior of said chamber.

9. The combination with ice-forming mechanism, of an ice-press in the form of a cylinder H provided at one end with an enlarged head G′ forming the mold or compression-chamber, cast segmental linings H² having flat inner faces and outer longitudinal channels or grooves intersected by transverse openings $l'$, and a door for the open end of the head G′ and provided with openings registering with the outer ends of said channels or grooves.

THOMAS L. RANKIN.

Witnesses:
M. A. CASSIDY,
HENRY T. BRENNAN.